May 3, 1966 J. W. BARTH 3,248,864
ARTICULATE MOUNTING FOR A LAWN MOWER ON A TRACTOR
Filed Nov. 29, 1963 2 Sheets-Sheet 2

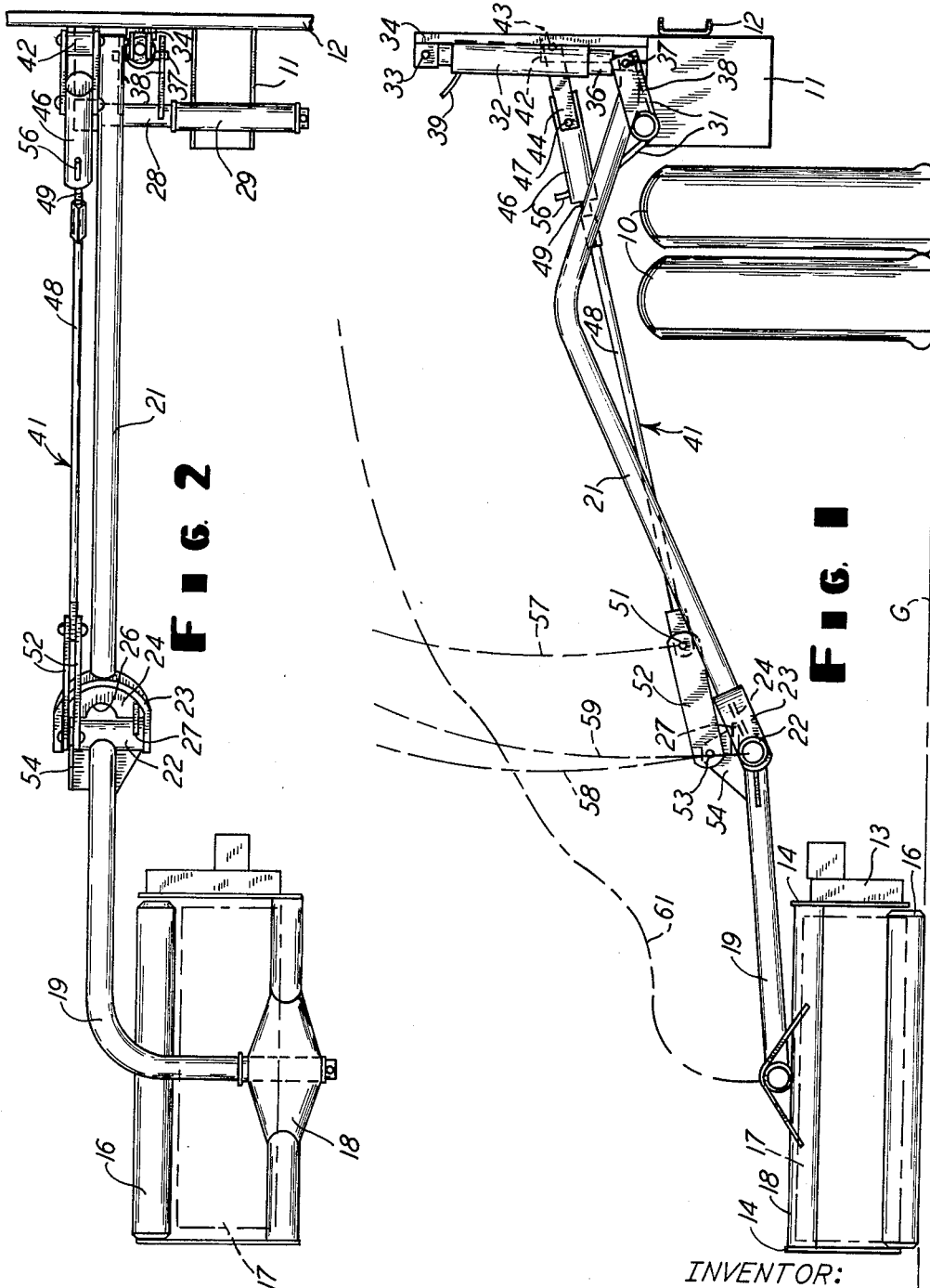
INVENTOR:
JOHN W. BARTH

INVENTOR:
JOHN W. BARTH

BY: Arthur J. Hansmann
ATTORNEY

United States Patent Office 3,248,864
Patented May 3, 1966

3,248,864
ARTICULATE MOUNTING FOR A LAWN
MOWER ON A TRACTOR
John W. Barth, Cudahy, Wis., assignor to Jacobsen Manufacturing Co., Racine, Wis., a corporation of Wisconsin
Filed Nov. 29, 1963, Ser. No. 326,886
2 Claims. (Cl. 56—26)

This invention relates to an articulate mounting for a lawn mower on a tractor, and more particularly, it relates to the mounting of a plurality of mowers on a single tractor.

In the art of mounting a gang of mowers on a single tractor, it is the common practice to provide seven, nine, or even eleven mowers on a single tractor in a manner that the mowers are staggered in the fore-and-aft direction of the tractor so that a wide swath is covered by the gang of mowers in the forward movement of the tractor. Depending upon the power of the tractor, the mounting members, and like features, the number of lawn mowers is selected according to the swath to be mowed. However, one limitation of the maximum number of mowers so mounted on a single tractor is the maneuverability of the tractor with the mowers both during the mowing operation and during the transport of the unit to and from the mowing site. Of course in the transport of the unit, it is required that the mowers be carried as close as possible to the tractor and at a limited height so that both the width and the height of the unit are a minimum dimension.

Accordingly, it is an object of this invention to provide a structural unit of an articulate mounting for lawn mowers on a tractor wherein the unit can be disposed in a transport position with a minimum of both width and height occupied by the unit. In at least certain preferred arrangements, it is desirable to have the width of a nine gang unit clear an eight foot wide doorway without of course detaching or removing any of the mowers but simply by placing them in the collapsed position.

Still another object of this invention is to provide an articulate mounting for lawn mowers on a tractor wherein the mowers are completely free for up-and-down movement to adjust to the contour of the lawn being mowed, but also wherein the mowers are controlled by a power means such as a hydraulic unit which causes the mowers to be placed in a collapsed position of minimum volume for the overall unit.

Still a further object of this invention is to provide a gang of lawn mowers mounted on a tractor in a manner such that the mowers can be raised to a compact position with respect to the tractor and thereby not span a width substantially greater than the width of the tractor itself.

Still another object of this invention is to provide an articulate mounting for a gang of lawn mowers on a tractor and with the mowers being controlled by a power lift means with the arrangement being such that the mower is completely free to follow the contour of the lawn being mowed but yet the mowers can be brought to a compact position with respect to the tractor when the unit is in the transport position. Thus in accomplishing this particular object, the mower mountings are arranged so that they negotiate the wheels of the tractor and are therefore secured in a maximum downward position but yet the mower can move further downward by means of an additional mounting which also returns the mower to its level or original position prior to actuation of the first mounting for bringing the mower to a transport position.

Other objects and advantages will become apparent upon reading the following description in light of the accompanying drawings, wherein:

FIG. 1 is a front elevational view of a preferred embodiment of this invention and showing a portion of a tractor therewith.

FIG. 2 is a top plan view of the embodiment shown in FIG. 1 and with some of the tractor also being shown.

Figures 3, 4:
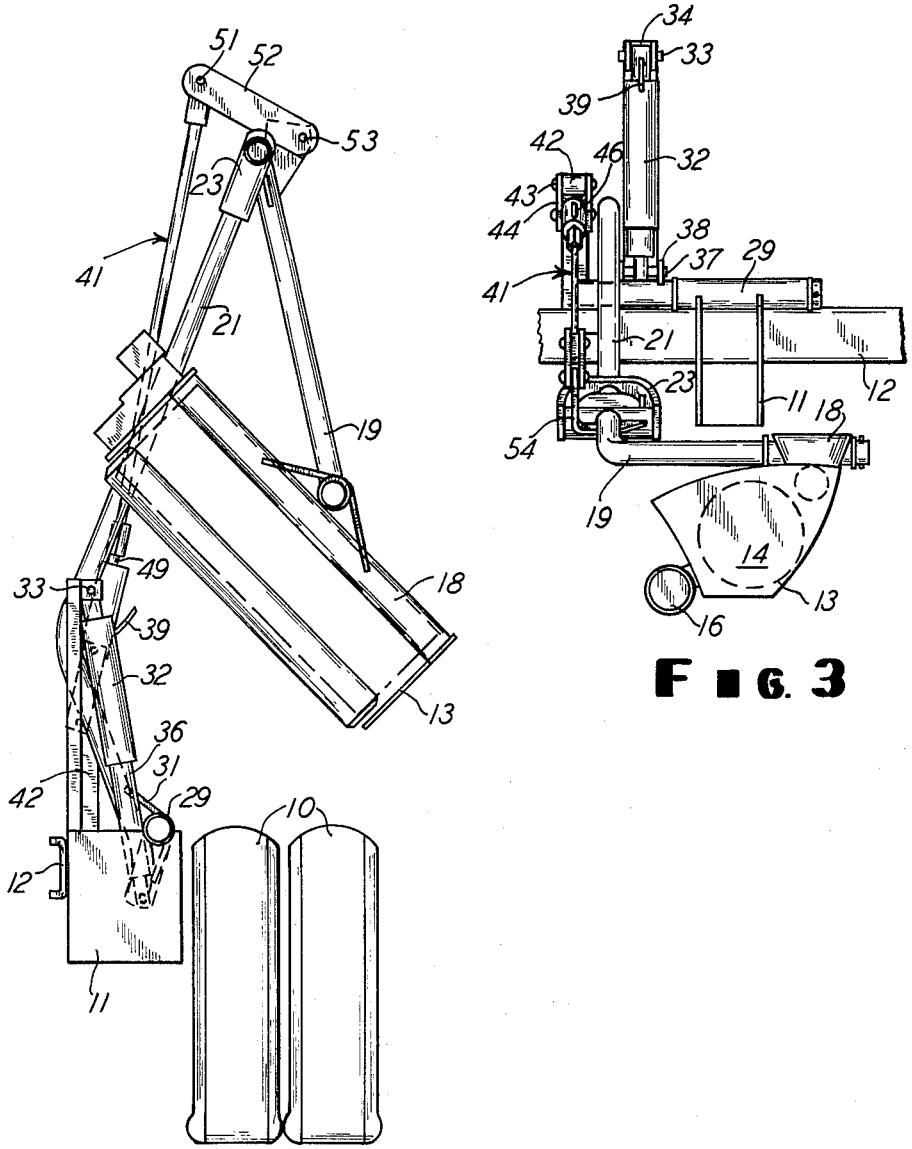
FIG. 3 is a side elevational view of that shown in FIG. 2.
FIG. 4 is a front elevational view of the embodiment shown in FIG. 1 but showing the side of the unit opposite that of FIG. 1.

The tractor may be of a conventional design and it is therefore only fragmentarily shown and it includes the front wheels 10 and a frame member 11 and a frame channel 12. Also it will of course be understood that these tractor elements are adequately connected together in the usual and well-known manner for the support of the implement or lawn mower mounting hereinafter described.

The ground line is indicated on the line designated G, and of course the wheels 10 are on the ground line and the lawn mower 13 is shown on the ground line. The mower is shown to include side plates 14, a roller 16, and a mowing reel designated 17 and shown in dot-dash lines. Also an upper mounting member 18 is included in the mower and has an extensive support member 19 pivotally connected thereto so that the mower 13 can pivot about its fore-and-aft axis in the desired manner of conforming to the contour of the lawn being moved.

The member 19 is shown to be L-shaped in FIG. 2, and is pivotally connected to a first support member 21 which is in turn pivotally attached or mounted on the tractor in a manner hereinafter described. Thus the member 19 has a cross-piece 22 which is pivotally connected to a yoke 23 rigidly attached to the extending end of the member 21. A web-plate 24 spans the interior of the yoke 23 and has a central opening 26 which receives the member 19 in the compact or collapsed position described in connection with FIG. 4. Also, a plate or abutment 27 is rigidly attached to the cross-member 22 to rotate therewith, and the plate 27 extends to the web 24 to engage the latter in the FIG. 1 position and thereby prevent buckling or downward collapse of the joint between the support members 19 and 21.

The end of the member 21 toward the tractor is pivotally mounted on a rotatable support 28 mounted in a socket 29 supported on the tractor member 11. Thus braces 31 are rigidly connected to the member 28 and are also connected by welding or the like to the support member 21 such that rotation of the member 28 causes like rotation or pivotal movement of the support member 21 in the up and down directions.

Power means are provided for the pivotal movement of the support member 21, and these means are shown to comprise the hydraulic cylinder 32 which is pivoted at 33 on a support 34 mounted on the tractor member 11. Thus the cylinder ram 36 extends downwardly from the cylinder 32 and is connected to the rotatable member 28 through a pin 37 and connecting plate 38 extending between the pin 37 and the member 28. Thus upon extension of the hydraulic ram 36 by means of fluid applied through the hydraulic line 39 in any well-known manner of hydraulic powering, the member 28 is rotated to pivotally rotate the support 21 and likewise the support 19 in a manner hereinafter described. FIGS. 1 and 4 show the support 21 to be pivotal through an angle of at least ninety degrees, from the horizontal position of FIG. 1 to the vertical position of FIG. 4.

At this point it will of course be understood that the support or mounting of the mower 13 is such that the mower can pivot with respect to the member 19 and in accordance with the contour of the ground, and also the member 19 can pivot downwardly from the position shown in FIG. 1 to permit the mower 13 to move uniformly downwardly, and still further the two support members 19 and 21 can pivot upwardly from the position shown in FIG. 1 to permit the mower to move likewise. The important feature of the entire arrangement is to move the mower 13 from the operating FIG. 1 position to the transport FIG. 4 position and to have it compact with respect to the tractor. The means employed for accomplishing this include a second support member generally designated 41 and pivotally connected to the tractor on a frame member 42 through a pivot pin 43 which connects between the member 42 and side plates 44. In turn a hydraulic cylinder 46 of the member 41 is connected to the plates 44 through a pin 47, and the member 41 then includes a rod 48 threadedly connected to the ram 49 of the cylinder 46.

The extending end of the member 41 is connected by means of a pivot pin 51 to plates 52 which in turn are pivotally connected by means of a pivot pin 53 to a plate 54 which is rigidly attached to the member 19 and extends thereabove. Also the usual hydraulic line 56 connects to the cylinder 46 and is powered by the usual fluid motor and pump which are not shown since they are of well-known and conventional design. Of course it will be understood that the arangement of the hydraulic cylinder 46 is such that upon pressurizing the cylinder through the line 56 the ram 49 will be retracted within the cylinder and therefore the member 41 will be retracted for a purpose hereinafter described.

Thus where no pressure is applied in the cylinder 46, the member 41 is allowed to extend to the limit of the hydraulic cylinder 46 and therefore the member 19 may pivot downwardly as the plate 54 pivots therewith and the member 41 extends away from the tractor. Thus at this point the member 41 does not in any way interfere with the pivotal action of the mower 13.

However when it is desired to raise the mower 13, then the cylinder 46 is pressurized to retract the ram 49 and thus bring the extension member 19 into the position shown in FIG. 1 in the event it was of course below that position. Then upon pressurizing the cylinder 32, the member 21 is pivoted upwardly to raise the extending end of the member 21 and also the junction joint between the members 21 and 19. Of course the weight of the mower 13 and the extension member 19 are downward on the extending end of the member 21, and therefore the member 41 is placed in tension since it is connected above the joint between the members 19 and 21. Therefore the member 41 remains of uniform length during the lifting of the mower 13, and accordingly the pins 51 and 53 follow the dot-dash lines 57 and 58 respectively, while the joint mentioned follows the line 59 and the connection between the mower and the member 19 follows the irregular line 61 with these lines all being shown in dot-dash representation. Thus the mower is raised to the FIG. 4 position which indicates of course the mower on the other side of the tractor but shows the mower in a compact transport position with respect to the tractor.

It will of course be therefore noted that the length of the support member 21 is substantially the same as the combined length of the extension member 19 and the extending half of the lawn mower 13 beyond the extension 19. This is of course for the purpose of placing the mower 13 laterally of the tractor in the mowing position and to a certain extent away from the tractor and also to then have the mower 13 hang in a transport position with a minimum of vertical projection of the support members 21 and 41. Still further it will be noted that the members 21 and 41 are arranged in the nature of a parallelogram such that upon raising of the mower the weight thereof of course places the member 41 in tension and thereby permits the extension 19 with the mower 13 to pivot downwardly with respect to the support member 21 in the transport position. It will further be understood that the support member 41 is actually a member of variable length in that in the operating position it extends when the mower 13 falls below the position occupied in FIG. 1 and of course the extension 19 pivots downwardly. However, when it is desired to have the mower raised to the transport position, then the pressurizing of the hydraulic cylinder 46 causes the effective length of the support member 41 to be shortened so that the components are placed in the position shown in FIG. 1 prior to raising the mower. Of course it would also be preferred that the supporting extension member 19 be connected to the mower 13 inwardly with respect to the center of gravity of the mower so that the latter would assume the tilted position shown in FIG. 4, or at least so the mower would tilt to occupy a minimum of lateral extent. Still further it will be understood that the mowers 13 will be either operated by ground engagement or additional power means may be employed for operating the mowers and such mechanism in either instance is of a well-known nature and need not be described.

While a specific embodiment of this invention has been shown and described, it should be obvious that certain changes can be made in the embodiment and the invention should therefore be interpreted only by the scope of the appended claims.

What is claimed is:

1. In an articulate mounting for a lawn mower on a tractor, the combination comprising a tractor, a first support member pivotally mounted on said tractor and extending laterally therefrom for up and down movement between a horizontal position and a vertical position, hydraulic means connected to said first support member for pivoting the latter on said tractor, second support means pivotally mounted on said tractor at a location vertically above the pivot axis of said first support member and extending laterally from said tractor for up and down movement at a level above said first support member between a horizontal position and a vertical position and being of a length equal to the length of said first support member, an extension support member pivotally connected to the extended end of said first support member for up and down pivotal movement and extending away from said tractor in the direction beyond said first support member and being rigid with the latter along the line parallel to the fore-and-aft axis of said tractor, a lawn mower pivotally attached to the extending end of said extension support member and extending therebeyond for pivotal movement of said lawn mower on the central axis of the latter parallel to said fore-and-aft axis, said extension support member and the extending portion of said lawn mower therebeyond being of a combined length similar to the length of said first support member such that said lawn mower depends to a level adjacent the level of the pivot of said first support member on said tractor when said first support member is in said vertical position, and means on said extension support member pivotally connected to the extending end of said second support means at a point immediately above the pivot point between said first support member and said extension support member for controlling the pivotal relation between the latter two members whereby when said first support member is in said horizontal position, said lawn mower is pivotally disposed in a moving position on the ground, and, when said first support member is raised to said vertical position, said lawn mower is initially raised up, and subsequently said lawn mower and said extension support member are caused to be disposed in folded positions with respect to said first support member.

2. The subject matter of claim 1, wherein said second support means includes a hydraulic cylinder in the length thereof for extension and contraction to permit variation in the overall length of said second support means for free up and down movement of said lawn mower in the mowing position along the ground, and to alternately render said second support means fixed in its overall length for controlling the pivotal movement of said extension support member in the raising of said lawn mower off the ground.

References Cited by the Examiner

UNITED STATES PATENTS

| 1,713,396 | 5/1929 | Rountree | 56—25 |
| 1,911,516 | 5/1930 | Landing | 56—25 |
| 2,680,946 | 6/1954 | Rousey | 56—25.4 |
| 3,058,281 | 10/1962 | Lewis | 56—7 |

FOREIGN PATENTS

| 23,873 | 10/1962 | Germany. |
| 1,084,074 | 6/1960 | Germany. |

ABRAHAM G. STONE, *Primary Examiner.*

J. O. BOLT, *Assistant Examiner.*